(12) United States Patent
Wu et al.

(10) Patent No.: US 11,798,432 B2
(45) Date of Patent: Oct. 24, 2023

(54) EXPERIMENT PLATFORM FOR SIMULATING FIRE IN UNDERGROUND TRAFFIC CONVERSION CHANNEL

(71) Applicant: ZHEJIANG UNIVERSITY, Hangzhou (CN)

(72) Inventors: Ke Wu, Hangzhou (CN); Tianhang Zhang, Hangzhou (CN); Mingjian Yin, Hangzhou (CN); Yunge Hou, Hangzhou (CN); Kaijie Wu, Hangzhou (CN); Chunhou Luo, Hangzhou (CN); Qimeng Guo, Hangzhou (CN); Xun Zhang, Hangzhou (CN); Xiaolong Yan, Hangzhou (CN); Yadong Huang, Hangzhou (CN)

(73) Assignee: ZHEJIANG UNIVERSITY, Hangzhou (CN)

(*) Notice: Subject to any disclaimer, the term of this patent is extended or adjusted under 35 U.S.C. 154(b) by 253 days.

(21) Appl. No.: 16/966,021

(22) PCT Filed: Oct. 18, 2019

(86) PCT No.: PCT/CN2019/111802
§ 371 (c)(1),
(2) Date: Jul. 30, 2020

(87) PCT Pub. No.: WO2020/103618
PCT Pub. Date: May 28, 2020

(65) Prior Publication Data
US 2021/0268324 A1 Sep. 2, 2021

(30) Foreign Application Priority Data
Nov. 21, 2018 (CN) .......................... 201811388149.6

(51) Int. Cl.
*G09B 23/12* (2006.01)
*A62C 99/00* (2010.01)
(Continued)

(52) U.S. Cl.
CPC .......... *G09B 23/12* (2013.01); *A62C 99/0081* (2013.01); *G09B 9/00* (2013.01); *G09B 25/00* (2013.01)

(58) Field of Classification Search
None
See application file for complete search history.

(56) References Cited

U.S. PATENT DOCUMENTS

| 4,646,564 A | 3/1987 | Ide et al. | |
|---|---|---|---|
| 2012/0049087 A1* | 3/2012 | Choi | G02B 21/367 250/459.1 |

FOREIGN PATENT DOCUMENTS

| CN | 1888533 A | 1/2007 |
|---|---|---|
| CN | 102750848 A | 10/2012 |

(Continued)

OTHER PUBLICATIONS

A study of the effect of plug-holing and boundary layer separation on natural ventilation with vertical shaft in urban road tunnel fires, Jun. 30, 2012.
(Continued)

*Primary Examiner* — Peter S Vasat
*Assistant Examiner* — Jennifer L Korb
(74) *Attorney, Agent, or Firm* — W&G Law Group

(57) ABSTRACT

The present disclosure provides an experiment platform for simulating fire in an underground traffic conversion channel, including: a model body configured to simulate fire in the an underground traffic conversion channel; a burner connected to the model body and configured to generate smoke; and a smoke imaging system including laser sheet light sources
(Continued)

and image recording devices configured to record smoke distribution images. The laser sheet light sources are in the model body, and plane laser light emitted by the laser sheet light sources is parallel to a flow direction of the smoke. The image recording devices are in one-to-one correspondence to the laser sheet light sources and are arranged outside an observation window of the model body. One laser sheet light source and one image recording device corresponding thereto each have a filter configured to filter out laser light of a same wavelength.

10 Claims, 7 Drawing Sheets

(51) Int. Cl.
  *G09B 9/00* (2006.01)
  *G09B 25/00* (2006.01)

(56) References Cited

FOREIGN PATENT DOCUMENTS

| CN | 105632318 | A | | 6/2016 | |
| CN | 104181162 | B | * | 8/2016 | |
| CN | 106971666 | A | | 7/2017 | |
| CN | 108492697 | A | * | 9/2018 | ............ G09B 25/00 |
| CN | 108492697 | A | | 9/2018 | |
| CN | 108682269 | A | | 10/2018 | |
| CN | 109712501 | A | | 5/2019 | |
| CN | 209357342 | U | | 9/2019 | |

OTHER PUBLICATIONS

International Search Report (PCT/CN2019/111802); dated Jan. 19, 2020.

* cited by examiner

EXPERIMENT PLATFORM FOR SIMULATING FIRE IN UNDERGROUND TRAFFIC CONVERSION CHANNEL

TECHNICAL FIELD

The present disclosure relates to the technical field of fire experiments, and in particular, to a device that performs a simulation experiment on smoke diffusion characteristics of fire in an underground traffic conversion channel.

BACKGROUND

As an urbanization process speeds up in China, the population is supersaturated, and traffic pressure is increasing, so traffic congestion has become a prominent problem that many cities face. Development and utilization of underground space is an important measure to relieve traffic pressure and save land resources, and the underground traffic conversion channel, as an important hub connecting three-dimensional traffic networks of a city, is gradually being promoted and applied. Due to a closed nature of an underground space structure, in the event of a fire, smoke exhaust and heat dissipation conditions are poor, a temperature is high, and toxic smoke will accumulate quickly, which seriously affects evacuation and rescue of personnel and easily causes mass deaths and injuries, thereby having a bad social impact and even resulting in public doubts about safety of the underground space. Therefore, it is of great significance for disaster prevention and mitigation to design a reasonable underground space ventilation and smoke exhaust system and determine a reasonable smoke prevention and exhaust system operation strategy.

The underground traffic conversion channel is usually formed by an open section connecting a plurality of communication channels. Compared to structures such as conventional tunnels or underground garages, smoke diffusion in the underground traffic conversion channel is more complicated, making it more difficult in terms of smoke prevention and exhaust, which specifically are as follows: 1) due to the communicated structure, ventilation airflows from two directions affect each other, making it difficult to determine a structure of a flow field in the open section; 2) a large number of fans are provided, and thus a lot of distribution and starting combinations exist; 3) fire scenes are more diverse.

Existing domestic and foreign relevant specifications only adopt an assumption of one-dimension and make provisions for a smoke prevention and exhaust system of a conventional tunnel, but there is no specific provision for the underground traffic conversion channels, such that a designer can only calculate, in accordance with an current provision of "Road Tunnel Ventilation Design Rules" (JTG/T D70/2-02-2014), a wind demand amount and a critical wind speed in the event of a fire in an underground traffic conversion channel, while applicability of the terms in the current provision is still in doubt due to particularity of the structure of the underground traffic conversion channel. Therefore, there is an urgent need to conduct research on smoke movement characteristics in the underground traffic conversion channels, thereby providing a reference for fire safety designs of similar projects.

Building a scale model according to similar criteria and performing situation inversion of smoke movement under actual fire conditions by observing a smoke trajectory in the scale model is a common method to study a law of smoke spread in underground space structures. China University of Science and Technology, Beijing University of Technology and other institutions have proposed corresponding scale model test methods according to characteristics of typical fire scenes such as urban tunnels, subway tunnels, and subway platforms.

However, due to particularity of the structure, the method used in existing patents cannot be directly applied to fire tests of the underground traffic conversion channels. For example, in a Chinese invention patent with an application number 201610814674. 4, only a single sheet light source is used to observe and record a smoke structure. However, in the underground traffic conversion channel, due to obvious wide and shallow characteristics of a cross-section, the smoke will also have a significant lateral spread feature in addition to a vertical direction, and a smoke movement trajectory of a single slice cannot represent the smoke diffusion characteristics therein, while if a plurality of sheet light sources are simply combined, images of respective slices will block and influence each other, making it impossible to directly record and observe.

SUMMARY

In view of the deficiencies in the related art, the present disclosure provides an experiment platform for simulating fire in an underground traffic conversion channel, which can facilitate study of lateral spread characteristics of smoke and is especially suitable for simulating fire in an underground traffic conversion channel.

An experiment platform for simulating fire in an underground traffic conversion channel is provided, including: a model body configured to simulate an underground traffic conversion channel; a burner connected to the model body and configured to generate smoke; and a smoke imaging system. The smoke imaging system includes a plurality of laser sheet light sources and a plurality of image recording devices configured to record smoke distribution images. The plurality of laser sheet light sources are arranged in the model body, and plane laser light emitted by the plurality of laser sheet light sources is parallel to a flow direction of the smoke. The plurality of image recording devices are in one-to-one correspondence to the plurality of laser sheet light sources and are arranged outside an observation window of the model body. One laser sheet light source and one image recording device corresponding thereto each have a filter configured to filter out laser light of a same wavelength.

The underground traffic conversion channel refers to a wide and shallow underground space formed by connecting a plurality of communication channels with an entrance and an exit of a garage in a specific section in order to achieve three-dimensional traffic to meet traffic demands of underground road networks and the garage.

In a fire scene, movement of the smoke in the underground traffic conversion channel can be summarized in two directions: one is flowing along a length direction of the underground traffic conversion channel, that is, flow from an air inlet port to an air outlet port, and this is a main direction of the movement of the smoke, and this is the flow direction of the smoke described above; the other one is diffusion along a cross-section, and the diffusion movement along the cross-section cannot be ignored due to the wide and shallow characteristics of the cross-section of the underground traffic conversion channel.

The laser sheet light source itself is the related art, and mutual influence between the laser light emitted by the laser sheet light sources can be avoided through arrangement of the plurality of laser sheet light sources, such that each of the image recording devices obtains a clear image. One laser sheet light source and one image recording device form one group, and one slice image of the smoke profile can be obtained, with the slice being parallel to the flow direction of the smoke. A group of mutually parallel slices can reflect the diffusion characteristics of the smoke in the lateral direction (perpendicular to the flow direction of the smoke) or the longitudinal direction (perpendicular to the flow direction of the smoke).

Optionally, the model body is formed as a cavity structure, and a size of the model body is ⅑ to ⅙ of a size of an actual underground project.

Geometric similarity is a premise of similarity in motion, and dynamic similarity must also be considered at the same time, that is, the scale test model should simultaneously satisfy buoyancy similarity and resistance similarity. When the geometric similarity scale between the main structure and the actual project is too small, test results are greatly affected by environmental factors and equipment accuracy. For example, when the test platform geometric similarity scale $\lambda_L < 1/15$, it can be obtained that a speed scale $\lambda_u = \lambda_L^{0.5} < 0.258$ according to the similar standard of Frode. In one aspect, in order to meet test measurement requirements, an instrument measurement accuracy should not be lower than $0.1 \cdot \lambda_u \approx 0.025$ m/s. In another aspect, in order to avoid environmental impact, it should also be required that an environmental disturbance wind speed in a laboratory is not larger than this value. Obviously, this is too strict for requirements of experiment conditions, making it uneasy to implement. In addition, in order to achieve resistance similarity simultaneously, a gas flow in the cavity should be in a region where a turbulent flow is fully developed, and in this case the Reynolds number in the cavity should be larger than $2.3 \times 10^4$. When $\lambda_L < 1/10$, in order to make the flow in the model cavity satisfy conditions for the full development of the turbulent flow, its flow velocity $$u \geq \frac{23000\nu}{\rho d \cdot \lambda_L} \approx 1.1 \text{ m/s},$$

and in this case an actual project flow velocity simulated by the model is larger than 3.5 m/s. Considering that an air flow velocity in an actual project is usually within a range from 1.5 m/s to 3.5 m/s, it can be seen that when $\lambda_L$ is too small, the practical applicability of the scale model will be greatly reduced. According to actually measured data, when the geometric similarity scale is not smaller than ⅑, the test system can be made more robust, and under this geometric scale, in a case of a commonly used tunnel ventilation speed, the gas flow in the test model platform can be in a state of the self-mold zone, which meets the resistance similarity condition. In addition, if the geometric similarity scale is larger than ⅙, fire source power in the scale model is too high, which will increase test risk. For example, when the geometric similarity scale is ⅕, the scale fire source power required for simulating a 5 MW fire will be 90 kW, and it is difficult to control such a high-power fire source in the laboratory, easily causing experimental accidents. Therefore, in the present disclosure, the geometric similarity scale of the underground traffic conversion channel test model and the actual project should be controlled within a range from ⅑ to ⅙.

Optionally, the model body includes an air duct in which fresh air and the smoke flow and a model wall surrounding the air duct, and a plurality of air interfaces are provided at the model wall.

Optionally, the experiment platform for simulating fire in the underground traffic conversion channel further includes a ventilation and smoke exhaust system connected to the model body. The ventilation and smoke exhaust system includes a plurality of sets of variable frequency fans, drainage ducts and jet nozzles connected in sequence. Fresh air generated by the variable frequency fan flows out of the jet nozzle after passing through the drainage duct, and the fresh air is connected to the gas interface through the jet nozzle.

Optionally, a jet boosting effect in a tunnel ventilation system can be simulated by means of the jet nozzle, and adjustment of a wind speed can be achieved by adjusting a working frequency of the variable frequency fan.

With the arrangement described above, the three-dimensional characteristics of fire smoke movement under different ventilation scheme conditions can be observed and recorded.

Optionally, the model body includes an open section unit, and each of two ends of the open section unit is connected to a communication channel unit through a corrugated hose. The communication channel unit is connected to a jack for adjusting gradient of the communication channel unit.

The gradient of the communication channel unit can be adjusted by changing the jack, and the three-dimensional characteristics of the fire smoke movement under different communication channel gradients can be observed and recorded through the arrangement described above.

Optionally, a side wall of the communication channel unit is provided with a first reserved port. Through the first reserved port, a bifurcation of a simulated underground garage can be connected thereto, and fireproof glass can also be embedded as an observation window.

Optionally, a side wall of the open section unit is provided with a second reserved port. A wind speed sensor, a pressure sensor and a temperature sensor in the related art can be connected thereto through the second reserved port.

Optionally, bottoms of the open section unit and the communication channel unit are provided with a third reserved port, and the burner is connected thereto through the third reserved port.

With the arrangement described above, the three-dimensional characteristics of fire smoke movement at different fire source positions can be observed and recorded.

Optionally, the experiment platform for simulating fire in the underground traffic conversion channel further includes a fuel supply module and an air supply module that are connected to the burner.

Optionally, the air supply module includes an air compressor, a pressure reducing valve, a pressure gauge, and a gas flow meter that are sequentially connected to an air delivery pipeline.

Optionally, the fuel supply module includes a gas fuel supply module and a liquid fuel supply module, and the gas fuel supply module includes a gas tank, a pressure reducing valve, a pressure gauge, and a gas flow meter that are sequentially connected to a gas fuel delivery pipeline. The liquid fuel supply module includes an air compressor, a pressure reducing valve, a pressure gauge, and a fuel-liquid bottle filled with the liquid fuel that are sequentially connected to the liquid fuel delivery pipeline. The air passes the fuel-liquid bottle to bring vapor of the liquid fuel into the liquid fuel delivery pipeline. The air supply module is directly connected to the burner, and one of the gas fuel supply module and the liquid fuel supply module is selected by the three-way valves to be connected to the burner.

With the arrangement described above, the three-dimensional characteristics of fire smoke movement at different fire source powers can be observed and recorded.

Optionally, an electronic balance, that represents a flow rate of the liquid fuel by measuring a mass of the liquid fuel in the fuel-liquid bottle, is provided below the fuel-liquid bottle.

The pressure of the gas source is adjusted by the pressure reducing valve to control the flow rate of the fuel, and the flow rate of the fuel is recorded by observing a mass change rate recorded by the electronic balance. When an amount of air provided is insufficient, it will cause insufficient combustion. When the amount of air is too much, the amount of gas that enters a reaction environment from the fire source also increases, which will produce an unpredictable remodeling effect on a local flow field. Therefore, controlling an appropriate fuel and air ratio is an important method to ensure authenticity of the simulation results.

Preferably, the fuel and air are mixed in following ratios.

A ratio of methane gas to air is within a range from a ratio of 1 L:5.5 L to a ratio of 1 L:6 L; or A ratio of liquefied gas to air is within a range from a ratio of 1 L:13.5 L to a ratio of 1 L:15 L; or A ratio of liquid ethanol to air is within a range from a ratio of 1 g:3.8 L to a ratio of 1 g:4.5 L; or A ratio of liquid n-heptane to air is within a range from a ratio of 1 g:6.7 L to a ratio of 1 g:8 L; or A ratio of liquid polyurethane to air is within a range from a ratio of 1 g:1.4 L to a ratio of 1 g:1.8 L.

Optionally, the burner is formed as a vertically arranged cavity structure and sequentially includes a mixing chamber and a rectification chamber from bottom to top. A lower part of the mixing chamber is provided with a fuel-gas inlet port and an air inlet port. Gas formed by mixing the fuel-gas and the air is mixed gas. An upper part of the rectification chamber is provided with a gas outlet port that is connected inside the cavity of the model body.

When the fuel is a gaseous combustible substance, the fuel-gas refers to the fuel itself. When the fuel is a liquid combustible substance, the fuel-gas refers to a mixture of vapor of liquid fuel and air. Here, any gas that can generate smoke through combustion can be called fuel-gas.

In order to make the structure of the fire model simulation experiment reflect the actual situation of the actual underground project fire, and one of important control factors is full combustion of the fuel.

Due to narrow space and high degree of closure, existing fire experiment platforms generally have problems of an insufficient supplementary air amount and the fuel being unable to be burned evenly, adequately and stably. Uneven combustion will make it difficult to control a flame state, which is extremely unfavorable for quantitative observation of flame shapes and smoke movement laws; while inadequate combustion will result in that a calorific value of the fuel cannot be fully released, which in turn results in that intensity of the smoke movement observed under the test conditions is weaker than that of the real fire scene. In addition, unstable reaction conditions will lead to disordered particle size distribution of smoke particles generated by combustion, which is not conducive to improving an imaging quality.

Different from a case in the related art where the fuel is directly introduced into the model body and burned while being mixed, by using the structure described above, the fuel and air are mixed first and then burned, such that the combustion of the fuel is more sufficient, and consumption of the fuel can better reflect the amount of smoke generated. In addition, it is also conducive to controlling the flame shape and generating stable smoke, thereby making the simulation results more accurate.

Optionally, the cavity of the mixing chamber is provided therein with an upper annular duct and a lower annular duct that are arranged side by side and have a same shape. Each of the upper annular duct and the lower annular duct annular duct is an annular cavity structure that is formed by rotating a rectangular cross-section around a circumference and includes an inner side wall and an outer side wall that are concentric. The outer side walls of the two annular ducts are respectively connected to the fuel-gas inlet port and the air inlet port, and the inner side walls of the two annular ducts are each provided with a plurality of gas outlet micropores.

Discharging the fuel-gas and the air from the gas outlet micropores can form a plurality of tiny turbulent flows, which is conducive to the full mixing of the fuel-gas and the air and improves uniformity of an outflow of the mixed gas, and together with a perpendicular arrangement of the gas inlet direction and the gas outlet direction, the flame shape can be kept relatively stable, making it convenient for recording a diffusion contour of the smoke.

Optionally, the cross-section of the mixing chamber is a square, an outer side wall of the annular duct is tangent to an inner wall of the mixing chamber, and a length $w_1$ of a side of the square and a flow rate Q of the mixed gas satisfy a following formula.

$$w_1 \geq \max\left(\sqrt{\frac{Q}{2160}}, 0.05\right)$$

In the formula, a unit of $w_1$ is m, and a unit of Q is m³/h.

Optionally, an inner diameter $R_2$ and an outer diameter $R_1$ of the annular duct satisfy a following formula.

$$0.6R_1 \leq R_2 \leq 0.8R_1$$

A height $h_1$ of the mixing chamber and the inner diameter $R_2$ of the annular duct satisfy a following formula.

$$h_1 \geq 8R_2$$

A distance $S_0$ between the upper and lower annular ducts satisfies a following formula.

$$h_1 - S_1 - S_2 - 0.2 < S_0 < h_1 - S_1 - S_2 - 0.1$$

In the formula, $S_1$ is a height of the upper annular duct, $S_2$ is a height of the lower annular duct, and units of $S_1$ and $S_2$ are both m.

An aperture ratio $n_0$ of the inner side wall satisfies a following formula.

$$n_0 \leq \frac{0.15(R_1 - R_2)}{\pi R_1}$$

Optionally, the rectification chamber includes a trapezoid and a cuboid from bottom to top. The gas outlet port is provided at a top surface of the cuboid. An upper bottom of the trapezoid is a square that is connected to the mixing chamber, and a lower bottom of the trapezoid is a rectangle that is connected to the cuboid. An arc-shaped flow distribution plate is provided between the upper bottom and the lower bottom of the trapezoid. The cuboid is provided with a horizontal primary flow equalization web at a middle position in a height direction, and the gas outlet port is provided with a horizontal secondary flow equalization web.

Two side surfaces of the trapezoid are perpendicular to a horizontal plane, and an angle formed between each of the other two side surfaces of the trapezoid and the horizontal plane is within a range from 10° to 45°. A center angle corresponding to the arc-shaped flow distribution plate is within a range from 5° to 8°. An angle formed between a lower end of the arc-shaped flow distribution plate and the horizontal plane is within a range from 67.5° to 80°. A surface of the arc-shaped flow distribution plate is arc-shaped surface, and the angle refers to an angle formed between a tangent plane of the arc-shaped surface at the lower end and the horizontal plane.

A distance between the primary flow equalization web and the arc-shaped flow distribution plate is within a range from 100 mm to 150 mm. The primary flow equalization web has an aperture ratio within a range from 25% to 40%, and an aperture diameter within a range from 4 mm to 6 mm.

Optionally, a distance $h_4$ between the primary flow equalization web and the secondary flow equalization web satisfies a following formula.

$$h_4 \geq \max\left[\left(\frac{2.4}{n} - 3.5\right) r_0, 0.05\right]$$

In the formula, n and $r_0$ respectively denote an aperture ratio and an aperture radius of the primary flow equalization web, and units of $r_0$ and $h_4$ are both mm.

An aperture ratio n' of the secondary flow equalization web satisfies a following formula.

$$n' \leq \min\left(\frac{Q}{2.5 A}, 8\%\right)$$

In the formula, Q denotes a flow rate of the mixed gas and has a unit of m³/s, and A denotes an area of a rectangular top surface of the cuboid and has a unit of m².

With the arrangement described above, constant combustion conditions can be provided, the calorific value of the fuel can be ensured to be fully released, a problem that the fire source power and the fuel consumption cannot correspond caused by the insufficient combustion is solved. Moreover, the smoke generated by combustion has a relatively stable particle size distribution characteristic. Therefore, the reliability and observability of the test results can be effectively improved.

Optionally, the plurality of laser sheet light sources are arranged in two columns in the model body, respectively along a width direction and a height direction of the model body. Each column of laser sheet light sources includes 2 to 5 laser sheet light sources spaced from each other by a spacing smaller than 0.3 m.

When a number of laser sheet light sources in each column is less than 2, three-dimensional observation cannot be achieved. When the number of laser sheet light sources in each column is more than 5, the laser light emitted by different laser sheet light sources will interfere with each other due to being limited by a laser spectrum width and the filter wavelength resolution, thereby affecting the imaging quality.

In the model test, a space scale not smaller than 0.3 m is required for the smoke to reach a full turbulent flow state, and a turbulent flow development process of the smoke flow can be observed through the arrangement described above.

Optionally, a wavelength λ of the laser light emitted by the laser sheet light source and a characteristic particle diameter $D_{32}$ of a specific surface area of the smoke generated by combustion of fuel satisfy a following formula.

$$\pi \cdot D_{32} - 10 < \lambda < \pi \cdot D_{32} + 10;$$

In the formula, units of λ and $D_{32}$ are both nm.

A working principle of the smoke imaging system is as follows: when the light passes through the smoke, it will be scattered by the smoke particles, scattering causes the light to have energy redistribution in non-primary propagation directions and radiate scattered light in all directions with smoke particles as a center, and scattered light is received and imaged by the image recording device, so as to complete observation and recording of the movement trajectory of the smoke particles.

An imaging effect of the smoke imaging system has a direct correlation with intensity of the scattered light, and the experiment results show that the intensity of the scattered light is mainly affected by the wavelength λ of the laser light emitted by the laser sheet light source and the characteristic particle diameter $D_{32}$ of the specific surface area of the smoke. When satisfying $\lambda = \pi \cdot D_{32}$, the scattered light has the best intensity, and a better imaging effect can be achieved. Specifically, a peak particle size range of the smoke generated when the common fuel is in sufficient and stable combustion and recommended laser wavelength used are shown in a table below.

| Fuel Type | Peak Particle Size/nm | Sheet Light Source 28 Type | Wavelength Distribution/nm |
|---|---|---|---|
| Ethanol | From 80 to 120 | Argon laser (blue) | 488 ± 10 |
| Methane | From 60 to 80 | Argon laser (blue) | 488 ± 10 |
| Liquefied Gas | From 80 to 100 | Argon laser (blue) | 488 ± 10 |
| n-heptane | From 200 to 250 | Helium laser (red) | 633 ± 10 |
| Polyurethane | From 170 to 210 | Helium laser (green) | 543 ± 10 |

The present disclosure provides an experiment platform for simulating fire in an underground traffic conversion channel, and it fills a technical gap of a scale model experiment device in the field of domestic underground traffic conversion channels, can conduct fire smoke diffusion tests under conditions of different fire source positions, different fire source powers, different communication channel gradients and ventilation schemes, and can observe and record the three-dimensional characteristics of the lateral spread of the smoke.

In addition, the experiment platform for simulating fire in the underground traffic conversion channel has following advantages.

1) The reduced scale is designed according to a principle of flow similarity, which is suitable for specific occasions of the underground traffic conversion channel;

2) The results obtained by the experiment simulation are closer to the actual situation, and burners, which can make the fuel-gas and the air be fully mixed and burned evenly and stably, are designed based on principles of fluid dynamics and taking pressure regulation and flow distribution as means, thereby increasing the degree of sufficiency of combustion to be above 98%, and causing combustion products to have constant and controllable particle size distribution;

3) A temperature, speed and pressure measurement system is used to collect test data, and a three-dimensional imaging system that can display complex movement characteristics of the smoke is designed to record the movement situations of the fire smoke, so as to lay foundation for study of the fire smoke diffusion characteristics in the underground traffic conversion platform, thereby providing a basis for design of related smoke exhaust and smoke control schemes.

Figure 1:
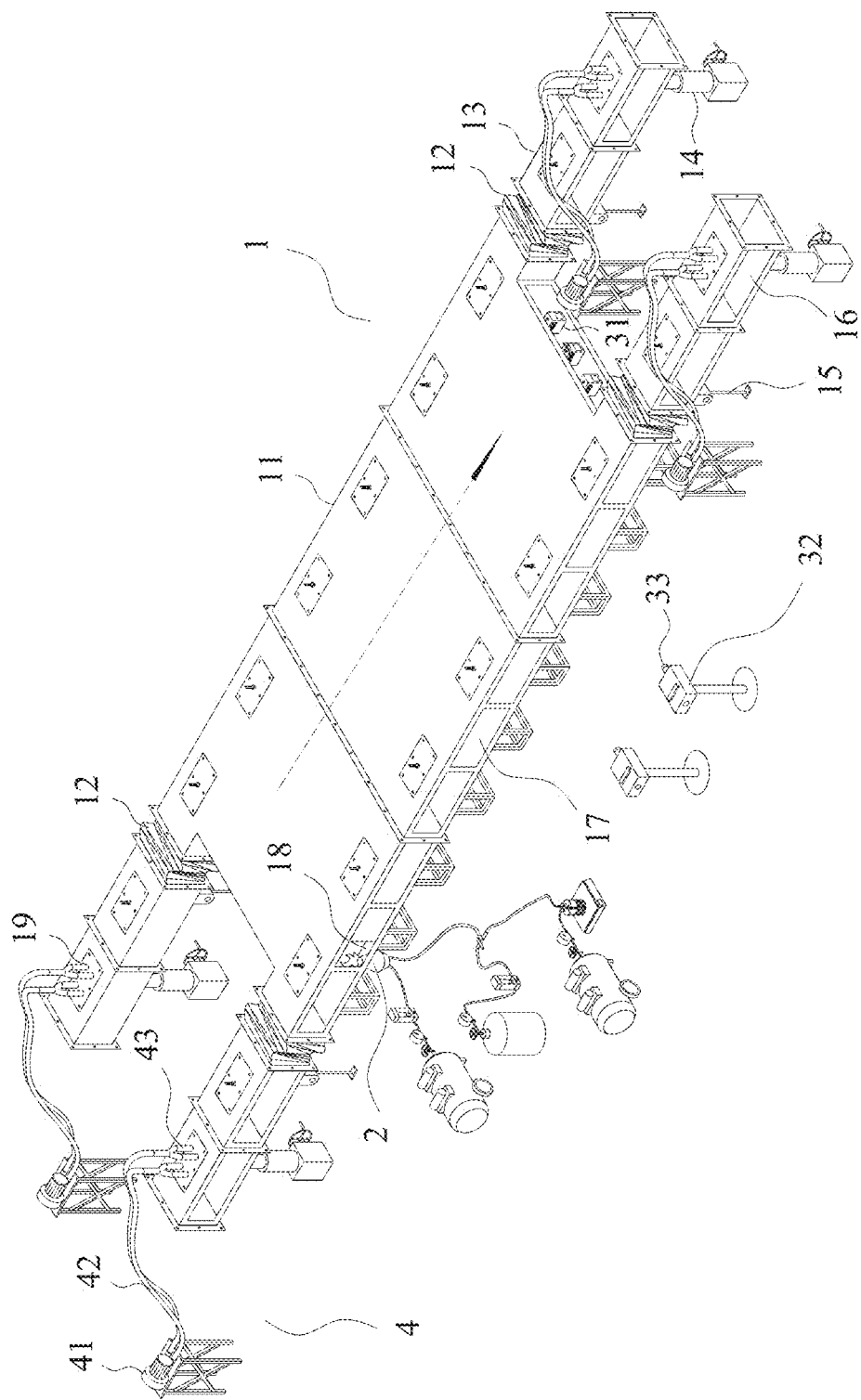
FIG. 1 is a structural schematic diagram of an embodiment of an experiment platform for simulating fire in an underground traffic conversion channel.
Figure 2:
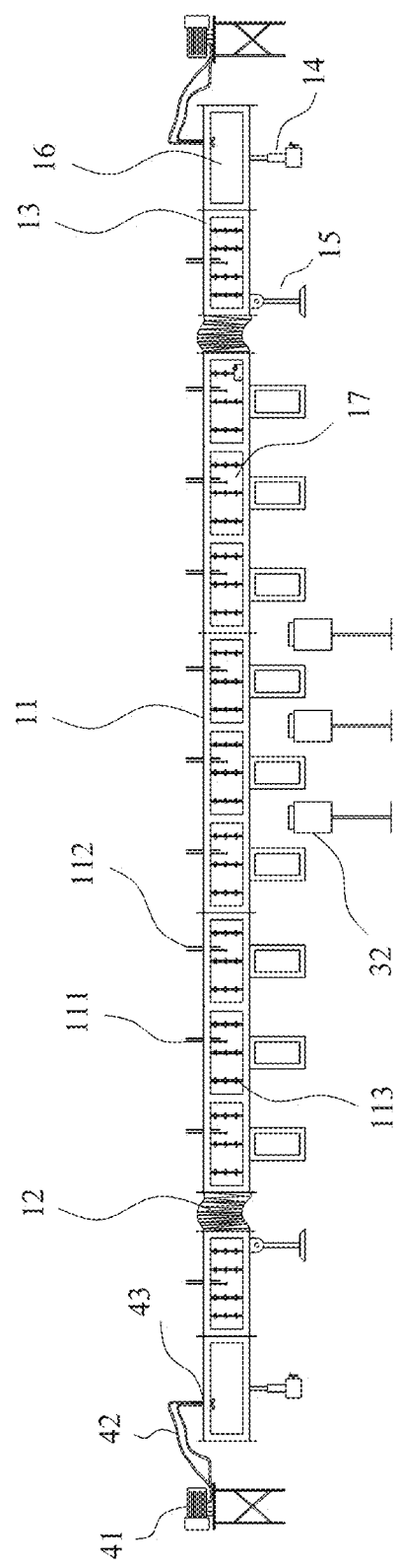
FIG. 2 is a front view of an experiment platform for simulating fire in an underground traffic conversion channel.

Description of reference signs in the drawing: 1. model body; 11. open section unit; 12. corrugated hose; 13. communication channel unit; 14. jack; 15. fixed hinge support; 16. first reserved port; 17. second reserved port; 18. third reserved port; 19. gas interface; 2. burner; 22. mixing chamber; 221. fuel-gas inlet port; 222. air inlet port; 223. annular pipe; 2231. height of upper annular pipe; 2232. height of lower annular pipe; 224. gas outlet micropore; 23. rectification chamber; 231. trapezoid; 232. cuboid; 233. gas outlet port; 234. arc-shaped flow distribution plate 235. primary flow equalization web; 236. secondary flow equalization web; 31. laser sheet light source; 32. image recording device; 33. filter; 4. ventilation and smoke exhaust system; 41. variable frequency fan; 42. drainage duct; 43. jet nozzle; 5. air compressor; 6. pressure reducing valve; 7. pressure gauge; 8. gas flow meter; 9. fuel-gas tank; 10. fuel-liquid bottle; 101. electronic balance; 21. three-way valve.

DESCRIPTION OF EMBODIMENTS

The technical solutions in the embodiments of the present disclosure will be described clearly and completely in conjunction with the drawings in the embodiments of the present disclosure. Obviously, the described embodiments are only a part of the embodiments of the present disclosure, but not all the embodiments. Based on the embodiments of the present disclosure, all other embodiments obtained by a person of ordinary skill in the art without making creative efforts fall within the protection scope of the present disclosure.

It should be noted that when referring that one component is "connected" to another component, it can be directly connected to another component or there may be an intermediate component. When a component is considered to be "provided at/on/in" another component, it may be provided directly at/on/in another component or there may be an intermediate component.

Unless otherwise defined, all technical and scientific terms used herein have the same meaning as commonly understood by those skilled in the technical field of the present disclosure. The terms used in the specification of the present disclosure herein is for the purpose of describing specific embodiments and not intended to limit the present disclosure.

Figure 3:
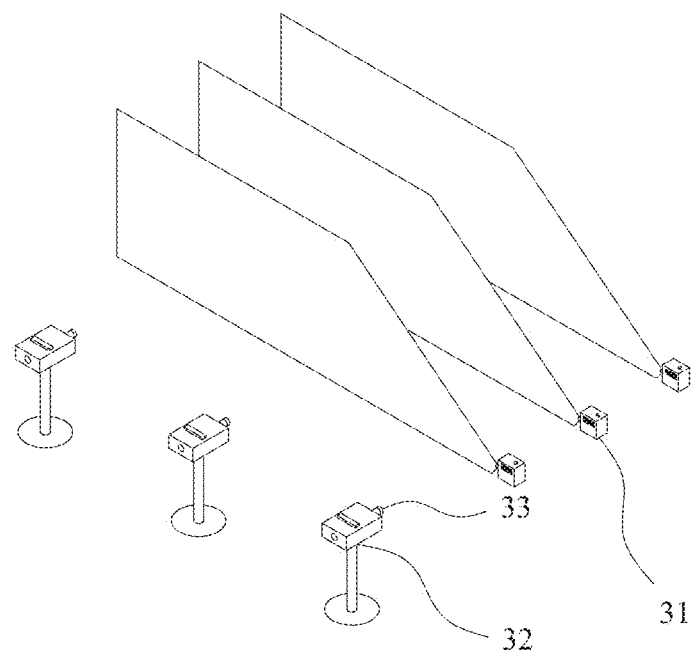
FIG. 3 is a structural schematic diagram of a column of laser sheet light sources and corresponding image recording devices.

As shown in FIG. 1 and FIG. 3, an experiment platform for simulating fire in an underground traffic conversion channel includes: a model body 1 for simulating an underground traffic conversion channel, a burner 2 that is connected to the model body 1 and generates smoke, and a smoke imaging system. The smoke imaging system includes a laser sheet light source 31 and an image recording device 32 that records smoke distribution images. A plurality of laser sheet light sources 31 are provided in the model body 1, and plane laser light emitted by the laser sheet light source 31 is parallel to a flow direction of the smoke. A plurality of image recording devices 32 one-to-one correspond to the plurality of laser sheet light sources 31 and are provided in the model body 1. One laser sheet light source 31 and one image recording device 32 corresponding thereto each have a filter 33 configured to filter out laser light of a same wavelength.

The arrangement of the plurality of laser sheet light sources 31 can avoid mutual influence between the laser light emitted by the laser sheet light sources 31, so that each of the image recording devices 32 obtains a clear image. One of the laser sheet light sources 31 and one of the image recording devices 32 form one group, and a slice image of one smoke profile can be obtained, with the slice being parallel to the flow direction of the smoke (as indicated by an arrow in FIG. 1); a group of slices parallel to each other can reflect spread characteristics of smoke in a horizontal direction (perpendicular to the flow direction of the smoke) or a longitudinal direction (perpendicular to the flow direction of the smoke).

Figure 7:
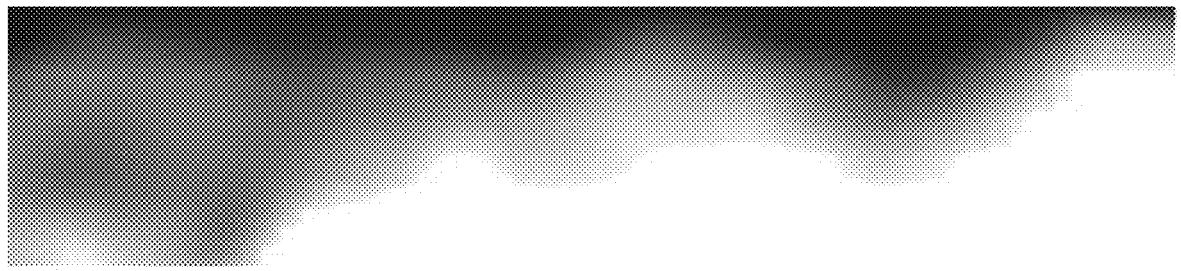
FIG. 7 is a smoke slice image obtained at a fire source in an embodiment.
Figure 8:
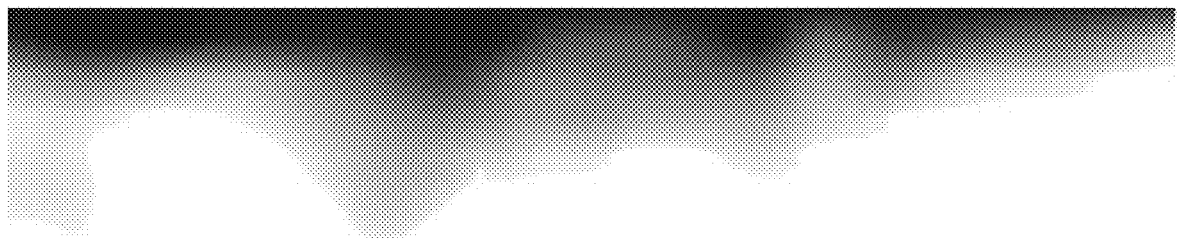
FIG. 8 is a smoke slice image obtained at a position near an observation window in an embodiment.
Figure 9:
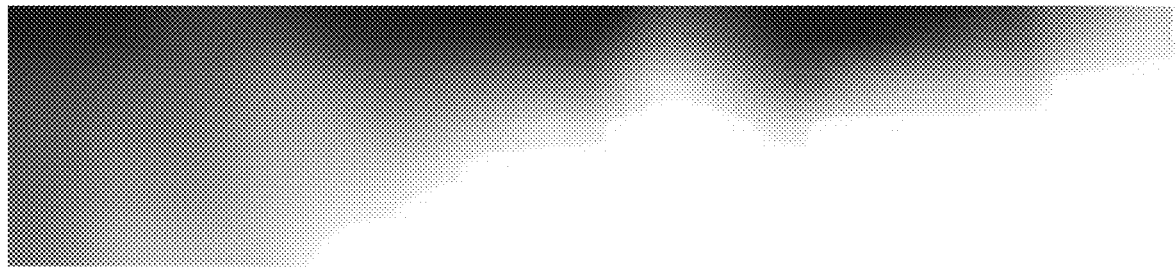
FIG. 9 is a smoke slice image obtained at a position away from an observation window in an embodiment.
Figure 10:
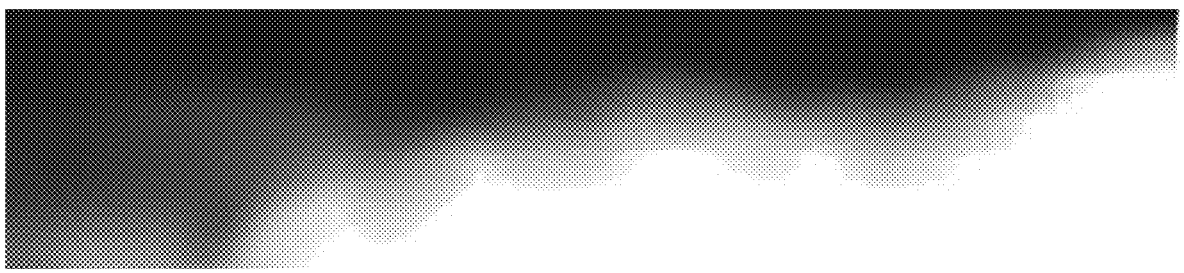
FIG. 10 is a smoke slice image obtained using the related art.

Based on the above arrangement, in other embodiments, a column of laser sheet light source groups are arranged along a lateral direction and respectively provided at a position of a fire source, at a position near an observation window and at a position away from the observation window, to obtain a group of slice images of the smoke contours, as shown in FIG. 7, FIG. 8 and FIG. 9, respectively. If the technology described in this present disclosure is not adopted and it is only that three laser sheet light sources are provided at corresponding positions, then a phenomenon, where the smoke contours are stacked on each other as shown in FIG. 10, will be observed, and compared with FIG. 10, the slice image group obtained by the improved device can better reflect real situations of the smoke contours at different positions.

In other embodiments, as shown in FIG. 1, the model body 1 is formed as a cavity structure, and a size of the model body is ⅕ to ⅙ of a size of an actual underground project. The model body 1 includes an open section unit 11, and each of two ends of the open section unit 11 is connected to a communication channel unit 13 through a corrugated hose 12. The communication channel unit 13 is connected to a fixed hinge support 15 and a jack 14 for adjusting gradient of the communication channel unit 13. A side wall of the communication channel unit 13 is provided with a first reserved port 16. Through the first reserved port 16, a bifurcation of a simulated underground garage can be connected, and fireproof glass can also be embedded as an observation window. A side wall of the open section unit 11 is provided with a second reserved port 17. A wind speed sensor 111, a pressure sensor 112 and a temperature sensor 113 in the related art can be connected thereto through the second reserved port 17. Bottoms of the open section unit 11 and the communication channel unit are provided with a third reserved port 18, and the burner 2 is connected thereto through the third reserved port 18.

In other embodiments, as shown in FIG. 1, the model body 1 includes an air duct in which fresh air and the smoke flow and a model wall surrounding the air duct, and a plurality of air interfaces 19 are provided at the model wall. The experiment platform for simulating fire in the underground traffic conversion channel further includes a ventilation and smoke exhaust system 4 connected to the model body 1. The ventilation and smoke exhaust system 4 includes a plurality of sets of variable frequency fans 41, drainage ducts 42 and jet nozzles 43 connected in sequence. Fresh air generated by the variable frequency fan 41 flows out of the jet nozzle 43 after passing through the drainage duct 42, and the fresh air is connected to the gas interface 19 through the jet nozzle 43. The jet nozzle 43 is installed above the model wall of the communication channel unit 13, a jet boosting effect in a longitudinal ventilation system of a tunnel can be simulated, and adjustment of a wind speed of the fresh air can be achieved by adjusting a working frequency of the variable frequency fan 41.

In other embodiments, as shown in FIG. 1 and FIG. 3, the plurality of laser sheet light sources 31 are arranged in two columns in the model body 1, respectively along a width direction and a height direction of the model body 1. Each column of laser sheet light sources 31 includes 2 to 5 laser sheet light sources 31 spaced from each other by a spacing smaller than 0.3 m. A wavelength λ of the laser light emitted by the laser sheet light source 31 and a peak particle diameter D of the smoke generated by combustion of fuel satisfy $\pi \cdot D - 10 < \lambda < \pi \cdot D + 10$. In the formula, units of λ and D are both nm.

Figure 4:
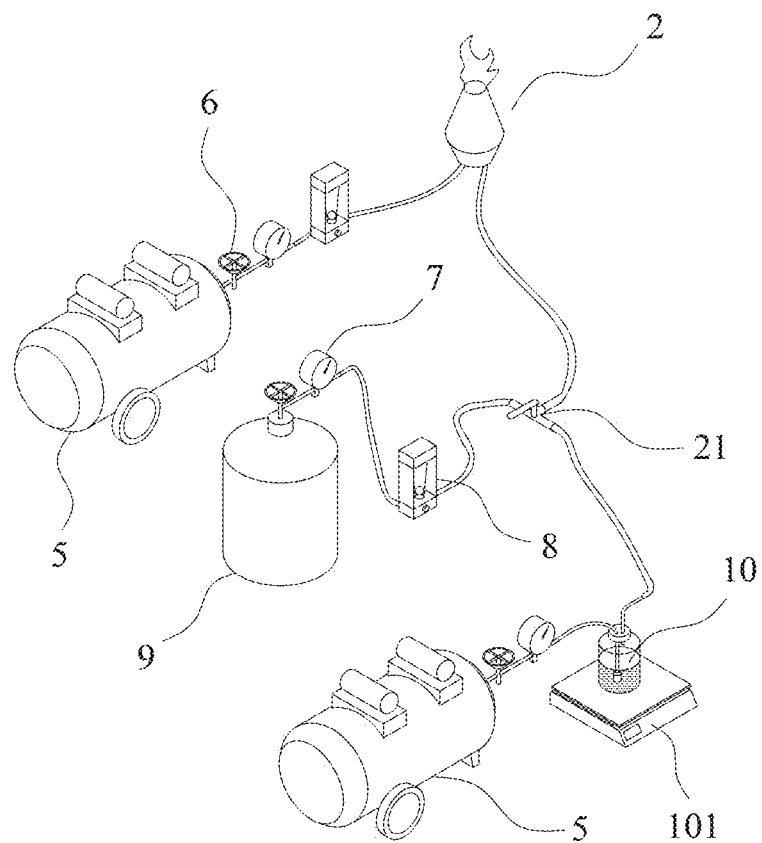
FIG. 4 is a structural schematic diagram of a burner and a gas supply device.

In order to facilitate control and measurement of a supply amount of the fuel, in other embodiments, as shown in FIG. 4, the experiment platform for simulating fire in the underground traffic conversion channel further includes a fuel supply module and an air supply module that are connected to the burner 2. The air supply module includes an air compressor 5, a pressure reducing valve 6, a pressure gauge 7, and a gas flow meter 8 that are sequentially connected to an air delivery pipeline. The fuel supply module includes a gas fuel supply module and a liquid fuel supply module.

The gas fuel supply module includes a gas tank 9, a pressure reducing valve 6, a pressure gauge 7, and a gas flow meter 8 that are sequentially connected to a gas fuel delivery pipeline. The liquid fuel supply module includes an air compressor 5, a pressure reducing valve 6, a pressure gauge 7, and a fuel-liquid bottle 10 filled with the liquid fuel that are sequentially connected to the liquid fuel delivery pipeline. An electronic balance 101, that represents a flow rate of the liquid fuel by measuring a mass of the liquid fuel in the fuel-liquid bottle 10, is provided below the fuel-liquid bottle 10. The air passes the fuel-liquid bottle 10 to bring vapor of the liquid fuel into the liquid fuel delivery pipeline. The air supply module is directly connected to the burner 2, and one of the gas fuel supply module and the liquid fuel supply module is selected by a three-way valves 21 to be connected to the burner 2.

Through the above arrangement, it is already possible to observe a three-dimensional image of the lateral spread characteristics of the smoke in the underground traffic conversion channel having obvious wide and shallow characteristics. In order to make the observation result closer to the smoke spread characteristics of the real fire site so as to make the results of the simulation experiment more instructive, existing smoke generation systems can be further improved.

Figure 5:
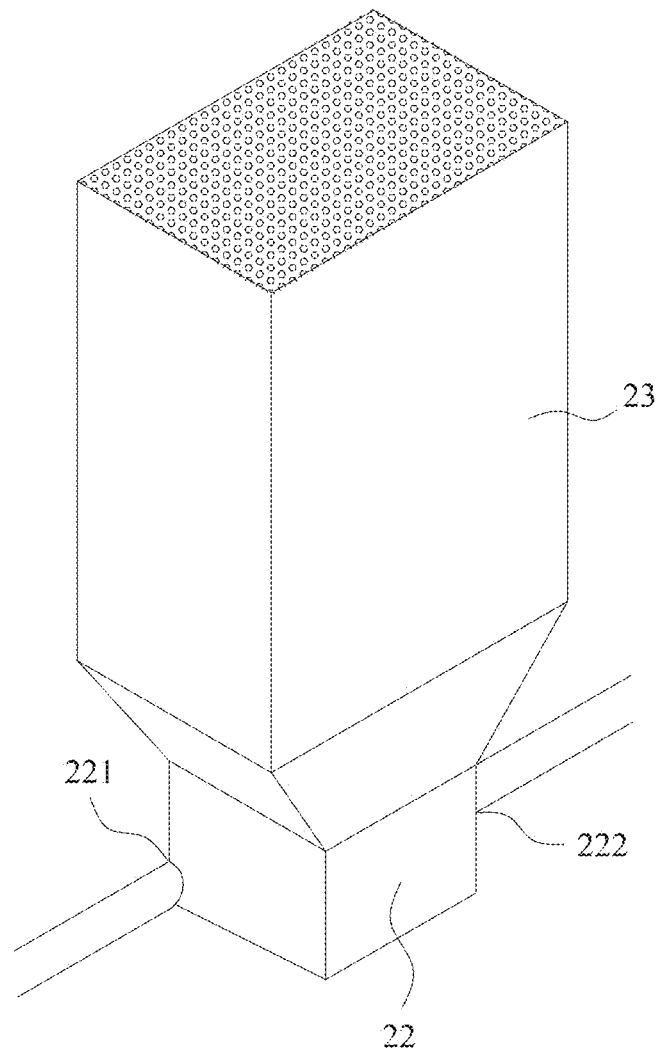
FIG. 5 is a schematic diagram of a profile of a burner.
Figure 6:
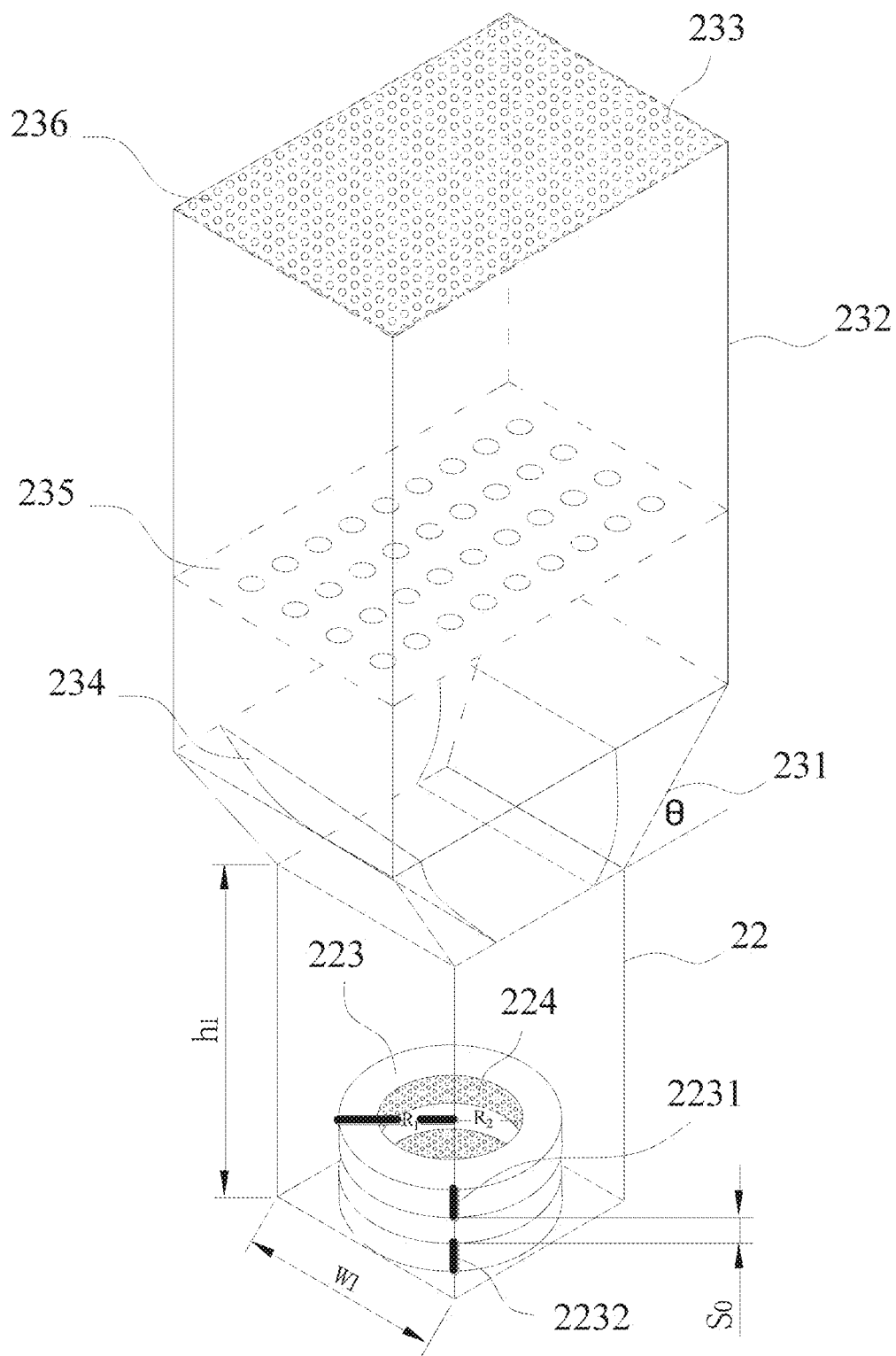
FIG. 6 is a schematic diagram of an internal structure of a burner.

In other embodiments, as shown in FIG. 5 and FIG. 6, the burner 2 is a vertically arranged cavity structure, and sequentially includes: a mixing chamber 22 and a rectification chamber 23 from bottom to top. A lower part of the mixing chamber 22 is provided with a fuel-gas inlet port 221 and an air inlet port 222, and the gas formed by mixing the fuel-gas and the air is mixed gas. An upper part of the rectification chamber 23 is provided with a gas outlet port 233 which is connected to a cavity of the model body.

The cavity of the mixing chamber 22 is provided therein with two, i.e., upper and lower annular ducts 223 arranged side by side and having a same shape. Each of the two annular ducts 223 is an annular cavity structure that is formed by rotating a rectangular cross-section around a circumference and includes an inner side wall and an outer side wall that are concentric. The outer side walls of the two annular ducts are respectively connected to the fuel-gas inlet port and the air inlet port, and the inner side walls of the two annular ducts are each provided with a plurality of gas outlet micropores 224.

The rectification chamber 23 includes a trapezoid 231 and a cuboid 232 from bottom to top, and the gas outlet port 233 is provided at a top surface of the cuboid. An upper bottom of the trapezoid 231 is a square that is connected to the mixing chamber 22, and a lower bottom of the trapezoid 231 is a rectangle that is connected to the cuboid 232. An arc-shaped flow distribution plate 234 is provided between the upper bottom and the lower bottom of the trapezoid 231. The cuboid 232 is provided with a horizontal primary flow equalization web 235 at a middle position in the height direction, and the gas outlet port 233 is provided with a horizontal secondary flow equalization web 236.

In other embodiments, the cross-section of the mixing chamber 22 is a square, the outer side wall of the annular duct 223 is tangent to the inner wall of the mixing chamber 22, and a length $w_1$ of a side of the square and the flow rate Q of the mixed gas satisfy a following formula.

$$w_1 \geq \max\left(\sqrt{\frac{Q}{2160}}, 0.05\right)$$

In the formula, a unit of $w_1$ is m, and a unit of Q is m³/h.

An inner diameter $R_2$ and an outer diameter $R_1$ of the annular duct 223 satisfy a following formula.

$$0.6R_1 \leq R_2 \leq 0.8R_1$$

A height $h_1$ of the mixing chamber 22 and the inner diameter $R_2$ of the annular duct 223 satisfy a following formula.

$$h_1 \geq 8R_2$$

A distance $S_0$ between the upper and lower annular ducts 223 satisfies a following formula.

$$h_1 - S_1 - S_2 - 0.2 < S_0 < h_1 - S_1 - S_2 - 0.1;$$

In the formula, $S_1$ denotes a height 2231 of the upper annular duct, $S_2$ denotes a height 2232 of the lower annular duct, and units of $S_1$ and $S_2$ are both m.

An aperture ratio $n_0$ of the inner side wall satisfies a following formula.

$$n_0 \leq \frac{0.15(R_1 - R_2)}{\pi R_1}.$$

Two side surfaces of the trapezoid 231 are perpendicular to the horizontal plane, and an angle θ formed between each of the other two side surfaces and the horizontal plane is within a range from 10° to 45°. A center angle corresponding to the arc-shaped flow distribution plate 234 is within a range from 5° to 8°. An angle formed between a lower end of the arc-shaped flow distribution plate 234 and the horizontal plane is within a range from 67.5° to 80°. A distance between the primary flow equalization web 235 and the arc-shaped flow distribution plate 234 is within a range from 100 mm to 150 mm. An aperture ratio n of the primary flow equalization web 235 is within a range from 25% to 40%, and an aperture diameter of the primary flow equalization web 235 is within a range from 4 mm to 6 mm. A distance h4 between the primary flow equalization web 235 and the secondary flow equalization web 236 satisfies a following formula.

$$h_4 \geq \max\left[\left(\frac{2.4}{n} - 3.5\right)r_0, 0.05\right]$$

In the formula, n and $r_0$ are respectively the aperture ratio and an aperture radius of the primary flow equalization web, and units of $r_0$ and $h_4$ are both mm.

The aperture ratio n' of the secondary flow equalization web 236 satisfies a following formula.

$$n' \leq \min\left(\frac{Q}{2.5\,A}, 8\%\right)$$

In the formula, Q denotes the flow rate of the mixed gas, and the unit is m³/s. A denotes an area of a rectangular top surface of the cuboid 232, and the unit is m².

Figure 11:
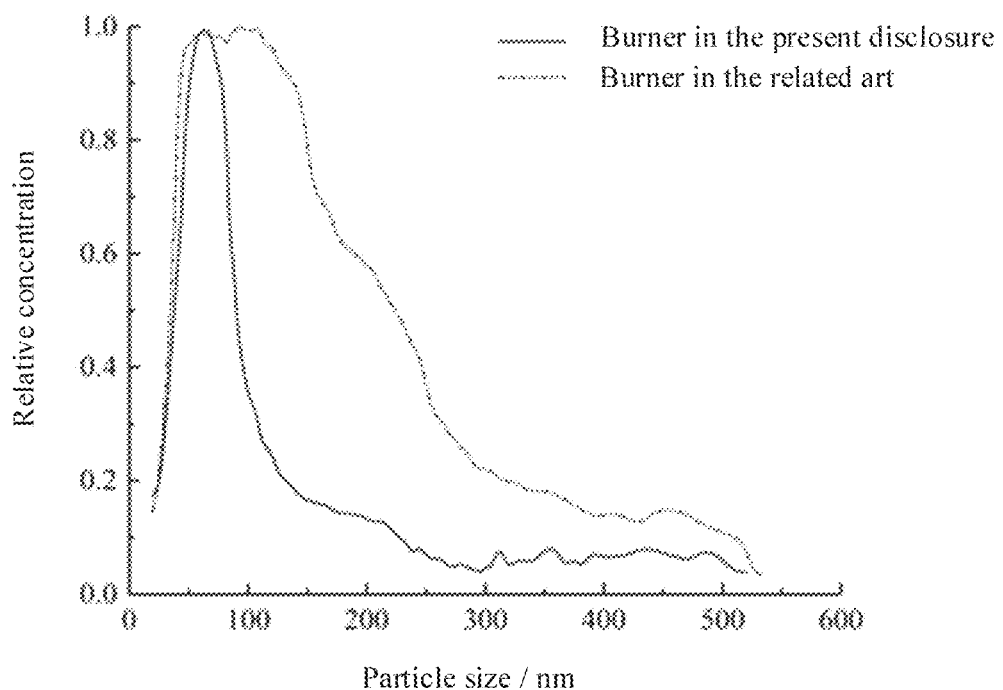
FIG. 11 illustrates relative concentration distribution of particle sizes when ethanol is burned in different burners.
Figure 12:
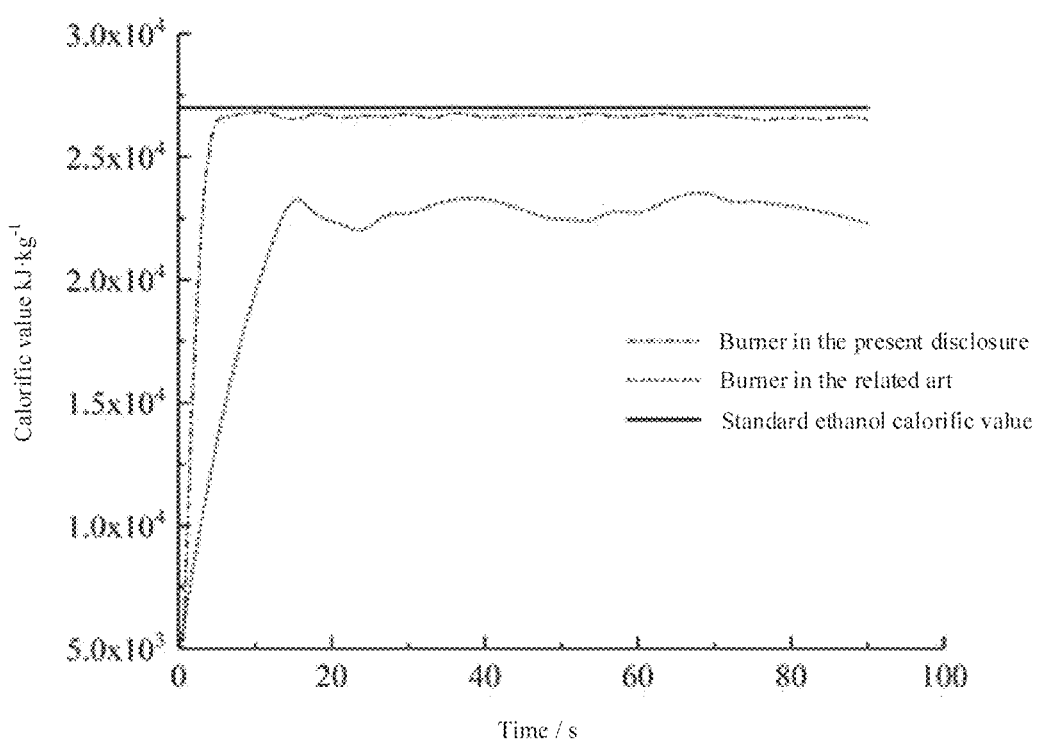
FIG. 12 illustrates change in calorific value when ethanol is burned in different burners.

In other embodiments, the open section unit 11 has a length of 11.6 m, a width of 4.5 m and a height of 0.83 m. The communication channel unit 13 has a length of 3.7 m. The fuel-gas is obtained by mixing liquid ethanol and air at a ratio of 1 g:4 L. The flow rate of the mixed gas in the mixing chamber 22 is 17.47 m³/s. A side length of the square is 0.1 m. The inner diameter of the annular duct 223 is 0.06 m. The height of the mixing chamber 22 is 0.5 m. The distance between the upper and lower annular ducts 223 is 0.015 m. The aperture ratio of the inner side wall of the annular duct 223 is 1.5%. The center angle of the arc-shaped flow distribution plate is 7°. The angle formed between the lower end of the arc-shaped flow distribution plate 234 and the horizontal plane is 75°, the distance between the primary flow equalization web 235 and the arc-shaped flow distribution plate 234 is 120 mm. The aperture ratio of the primary flow equalization web 235 is 30%, and the aperture diameter of the primary flow equalization web 235 is 5 mm. The distance between the primary flow equalization web 235 and the secondary flow equalization web 236 is 0.15 m. The aperture ratio of the secondary flow equalization web 236 is 5%. Relative concentration distribution of the smoke particle sizes obtained by using the burner described above is as shown in FIG. 11, and the calorific value released with time is as shown in FIG. 12. Compared with the burner in the related art, the particle sizes of the smoke produced by the burner in the present disclosure are more uniform and the calorific value of the fuel is fully released. The data of fire simulation using this device is closer to true values.

The above embodiment only illustrates several implementations of the present disclosure, and its description is relatively specific and detailed, but it should not be understood as limiting the scope of the present disclosure. It should be noted that, for those of ordinary skill in the art, several modifications and improvements can be made without departing from the concept of the present disclosure, and these all belong to the protection scope of the present disclosure. Therefore, the protection scope of the present disclosure shall be subjected to the appended claims.

What is claimed is:

1. An experiment platform for simulating fire in an underground traffic conversion channel, comprising:
   a model body configured to simulate the underground traffic conversion channel,
   a burner connected to the model body and configured to generate smoke; and
   a smoke imaging system comprising a plurality of laser sheet light sources and a plurality of image recording devices configured to record smoke distribution images,
   wherein the plurality of laser sheet light sources are arranged in the model body, plane laser light emitted by the plurality of laser sheet light sources is parallel to a flow direction of the smoke, and the flow direction of the smoke and a direction of the plurality of laser sheet light sources are consistent with a length direction of the underground traffic conversion channel;
   the plurality of image recording devices are in one-to-one correspondence to the plurality of laser sheet light sources and are arranged outside an observation window of the model body, and in a horizontal plane corresponding to the underground traffic conversion channel, a direction of the plurality of image recording devices is perpendicular to the length direction of the underground traffic conversion channel; and
   one of the plurality of laser sheet light sources and one of the plurality of image recording devices corresponding thereto each have a filter configured to filter out laser light of a same wavelength.

2. The experiment platform for simulating fire in the underground traffic conversion channel according to claim 1, wherein the model body is formed as a cavity structure, and a size of the model body is ⅑ to ⅙ of a size of an actual underground project.

3. The experiment platform for simulating fire in the underground traffic conversion channel according to claim 1, wherein the burner is formed as a vertically arranged cavity structure, and sequentially comprises, from bottom to top, a mixing chamber and a rectification chamber; a lower part of the mixing chamber is provided with a fuel-gas inlet port and an air inlet port, and gas formed by mixing fuel-gas and air is mixed gas; and an upper part of the rectification chamber is provided with a gas outlet port that is connected to a cavity of the model body.

4. The experiment platform for simulating fire in the underground traffic conversion channel according to claim 3, wherein a cavity of the mixing chamber is provided therein with an upper annular duct and a lower annular duct that are arranged side by side and have a same shape; each of the upper annular duct and the lower annular duct is an annular cavity structure formed by rotating a rectangular cross-section around a circumference, and comprises an inner side wall and an outer side wall that are concentric; and the outer side wall of the upper annular duct and the outer side wall of the lower annular duct are respectively connected to the fuel-gas inlet port and the air inlet port, and the inner side wall of the upper annular duct and the inner side wall of the lower annular duct are each provided with a plurality of gas outlet micropores.

5. The experiment platform for simulating fire in the underground traffic conversion channel according to claim 4, wherein a cross-section of the mixing chamber is a square, the outer side wall of the annular duct is tangent to an inner wall of the mixing chamber, and a length $w_1$ of a side of the square and a flow rate Q of the mixed gas satisfy a following formula:

$$w_1 \geq \max\left(\sqrt{\frac{Q}{2160}}, 0.05\right);$$

where a unit of $w_1$ is m, and a unit of Q is m³/h.

6. The experiment platform for simulating fire in the underground traffic conversion channel according to claim 5, wherein an inner diameter $R_2$ and an outer diameter $R_1$ of the annular duct satisfy a following formula:

$0.6R_1 \leq R_2 \leq 0.8R_1$;

a height $h_1$ of the mixing chamber and the inner diameter $R_2$ of the annular duct satisfy a following formula:

$h_1 \geq 8R_2$;

a distance $S_0$ between the upper annular duct and lower annular duct satisfies a following formula:

$h_1-S_2-0.2 < S_0 < h_1-S_2-0.1$;

where S1 denotes a height of the upper annular duct, S2 denotes a height of the lower annular duct, and units of S1 and S2 are both m; and an aperture ratio $n_0$ of the inner side wall satisfies a following formula:

$$n_0 \leq \frac{0.15(R_1 - R_2)}{\pi R_1}.$$

7. The experiment platform for simulating fire in the underground traffic conversion channel according to claim 3, wherein the rectification chamber sequentially comprises a trapezoid and a cuboid from bottom to top, and the gas outlet port is provided at a top surface of the cuboid; an upper bottom of the trapezoid is a square that is connected to the mixing chamber, and a lower bottom of the trapezoid is a rectangle that is connected to the cuboid; an arc-shaped flow distribution plate is provided between the upper bottom and the lower bottom of the trapezoid; the cuboid is provided with a horizontal primary flow equalization web at a middle position in a height direction, and the gas outlet port is provided with a horizontal secondary flow equalization web; two side surfaces of the trapezoid are perpendicular to a horizontal plane, and an angle formed between each of the other two side surfaces of and the trapezoid and the horizontal plane is within a range from 10° to 45°;

a center angle corresponding to the arc-shaped flow distribution plate is within a range from 5° to 8°;

an angle formed between a lower end of the arc-shaped flow distribution plate and the horizontal plane is within a range from 67.5° to 80°;

a distance between the primary flow equalization web and the arc-shaped flow distribution plate is within a range from 100 mm to 150 mm; and the primary flow equalization web has an aperture ratio within a range from 25% to 40%, and an aperture diameter within a range from 4 mm to 6 mm.

8. The experiment platform for simulating fire in the underground traffic conversion channel according to claim 7, wherein a distance $h_4$ between the primary flow equalization web and the secondary flow equalization web satisfies a following formula:

$$h_4 \geq \max\left[\left(\frac{2.4}{n} - 3.5\right) r_0, 0.05\right];$$

where n and $r_0$ respectively denote the aperture ratio of the primary flow equalization web and an aperture radius of the primary flow equalization web, and units of $r_0$ and $h_4$ are both mm; and an aperture ratio n' of the secondary flow equalization web satisfies a following formula:

$$n' \leq \min\left(\frac{Q}{2.5\,A}, 8\%\right),$$

where Q denotes a flow rate of the mixed gas, and has a unit of m³/s, and A denotes an area of a rectangular top surface of the cuboid, and has a unit of m².

9. The experiment platform for simulating fire in the underground traffic conversion channel according to claim 1, wherein the plurality of laser sheet light sources are arranged in two columns in the model body, respectively along a width direction and a height direction of the model body, and each column of laser sheet light sources comprises 2 to 5 laser sheet light sources spaced apart from each other by a spacing smaller than 0.3 m.

10. The experiment platform for simulating fire in the underground traffic conversion channel according to claim 1, wherein a wavelength λ of the laser light emitted by the plurality of laser sheet light sources and a characteristic particle diameter $D_{32}$ of a specific surface area of the smoke satisfy a following formula:

$\pi \cdot D_{32}-10 < \lambda < \pi \cdot D_{32}+10$;

where units of λ and $D_{32}$ are both nm.

* * * * *